United States Patent
Keck, II (10) Patent No.: US 10,759,350 B2
(45) Date of Patent: Sep. 1, 2020

(54) MODULAR ROOF RAIL SUBSTRATE

(71) Applicant: Dura Operating, LLC, Auburn Hills, MI (US)

(72) Inventor: Kenneth Keck, II, Clinton Township, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 16/057,889

(22) Filed: Aug. 8, 2018

(65) Prior Publication Data

US 2020/0047678 A1    Feb. 13, 2020

(51) Int. Cl.
*B60R 9/00* (2006.01)
*B60R 9/04* (2006.01)

(52) U.S. Cl.
CPC ..................... *B60R 9/04* (2013.01)

(58) Field of Classification Search
CPC ...................................... B60R 9/04
USPC ........................................ 224/325
See application file for complete search history.

(56) References Cited

U.S. PATENT DOCUMENTS

| 4,343,419 | A | * | 8/1982 | Mareydt | .......... | B60R 9/04 |
| | | | | | | 224/326 |
| 4,767,040 | A | * | 8/1988 | Miller | .......... | B60R 9/04 |
| | | | | | | 224/325 |
| 4,911,349 | A | * | 3/1990 | Miller | .......... | B60R 9/04 |
| | | | | | | 224/309 |
| 6,415,970 | B1 | * | 7/2002 | Kmita | .......... | B60R 9/04 |
| | | | | | | 224/309 |
| 6,564,433 | B2 | * | 5/2003 | Nagasawa | .......... | B60R 13/04 |
| | | | | | | 24/289 |
| 7,004,535 | B1 | * | 2/2006 | Osterberg | .......... | B60R 13/04 |
| | | | | | | 296/203.03 |
| 7,029,060 | B1 | * | 4/2006 | Osterberg | .......... | B60R 13/04 |
| | | | | | | 296/203.03 |
| 8,056,783 | B2 | * | 11/2011 | Hirano | .......... | B60R 9/04 |
| | | | | | | 224/309 |
| 9,352,696 | B2 | | 5/2016 | Gorey et al. | | |
| 2006/0049322 | A1 | * | 3/2006 | Hirano | .......... | B60R 9/04 |
| | | | | | | 248/237 |
| 2008/0083800 | A1 | * | 4/2008 | Mathew | .......... | B60R 9/04 |
| | | | | | | 224/326 |
| 2010/0288807 | A1 | * | 11/2010 | Neu | .......... | B60R 9/04 |
| | | | | | | 224/309 |
| 2014/0131406 | A1 | * | 5/2014 | Jutila | .......... | B60R 9/058 |
| | | | | | | 224/321 |
| 2017/0349107 | A1 | * | 12/2017 | Tough | .......... | B60R 9/045 |
| 2019/0071031 | A1 | * | 3/2019 | Sharron | .......... | B60R 9/04 |

FOREIGN PATENT DOCUMENTS

| CN | 107458317 A | 12/2017 |
| WO | 2014015919 A1 | 1/2014 |
| WO | 2015085431 A1 | 6/2015 |

* cited by examiner

*Primary Examiner* — Peter N Helvey
(74) *Attorney, Agent, or Firm* — Vivacqua Crane PLLC (57) ABSTRACT

A roof rail attachable to a roof of a motor vehicle includes a modular substrate connected to the roof, the modular substrate having a first portion connected by a first connection feature to a second portion. A cover is connected to the modular substrate and covers the modular substrate.

12 Claims, 6 Drawing Sheets

MODULAR ROOF RAIL SUBSTRATE

FIELD

The invention relates generally to a modular substrate for a roof rail, and more particularly to a modular substrate having multiple portions that connect together to vary the length of the modular substrate.

BACKGROUND

The statements in this section merely provide background information related to the present disclosure and may or may not constitute prior art.

To increase the cargo capacity of a motor vehicle, a crossbar and rail assembly may be installed on the roof of the motor vehicle. Cargo may be secured to the crossbar and rail assembly which acts as a universal attachment point between the motor vehicle and the cargo. Examples of cargo include ski or snowboards, bikes, cargo cages, or cargo containers, to name but a few. The crossbar and rail assembly is typically attached directly to the roof panel of the motor vehicle.

The roof rails are typically long parts, and thus require large injection mold tools and presses to be manufactured. The cost of the large tools and presses is higher compared to smaller tools and presses. Also, vehicles have varying lengths, so each vehicle model requires separate roof rail tooling, at great expense. To reduce the tooling and press costs and allow roof rails parts, particularly the substrate which is not an exposed surface on the vehicle, to be used across multiple vehicle types, a new and improved design for a substrate for a roof rail is desirable.

SUMMARY

According to several aspects, a roof rail attachable to a roof of a motor vehicle includes a substrate connected to the roof, the substrate having a first portion connected by a first connection feature to a second portion; and a cover connected to the substrate and covering the substrate.

In one aspect, the first portion includes a first distal end of the roof rail and the second portion is a central portion of the roof rail.

In another aspect, the substrate further includes a third portion connected to the second portion by a second connection feature, the third portion including a second distal end of the roof rail.

In another aspect, the first substrate portion and the second substrate portion each include a first wall and a second wall extending generally upward from the roof and a top portion connecting the first wall with the second wall.

In another aspect, the first connecting feature includes a hook formed in the first wall or the second wall of the first portion and a tab formed in the first wall or the second wall of the second portion, wherein the tab is sized to fit within the hook to align the first and second portions together.

In another aspect, the tab and the hook are formed in the first wall.

In another aspect, the first connecting feature further comprises a first tab extending from the first wall of the first portion or the second portion, the first tab having a first rib configured to melt under sonic welding.

In another aspect, the first connecting feature further comprises a second tab extending from the second wall of the first portion or the second portion, the second tab having a second rib configured to melt under sonic welding.

In another aspect, the first connecting feature further comprises a flange extending outward from the second wall of the first portion or the second portion and a groove extending outward from the second wall of the other portion, the flange fits within the groove.

In another aspect, the groove includes a third rib configured to melt under sonic welding.

In another aspect, the first portion and the second portion each include an end wall that connects the first wall, the second wall, and the top portion.

In another aspect, the first connecting feature comprises a rib extending out from the end wall of the first portion or the second portion, a slot formed in the end wall of the other portion, and a spring clip disposed on the rib, wherein the rib and spring clip are disposed in the slot.

In another aspect, the first connecting feature further comprises a pin having ribs extending out from the end wall of the first portion or the second portion and a pin aperture formed in the end wall of the other portion, wherein the pin is disposed within the pin aperture.

In another aspect, the first connecting feature further comprises a stud extending out from the end wall of the first portion or the second portion and a stud aperture formed in the end wall of the other portion, wherein the stud is disposed within the stud aperture.

In another aspect, the first connecting feature comprises an adhesive disposed on the end wall of the first portion or the second portion.

In another aspect, the cover includes a rolled top that is disposed over a lip that extends out from the top portion and is planar with the first wall and a rolled bottom that is disposed over a bottom of the first wall.

In another aspect, the cover forms an inner decorative surface of the roof rail.

According to several other aspects, a roof rail attachable to a roof of a motor vehicle includes a substrate connected to the roof, the substrate having a first portion connected by a first connection feature to a second portion and a third portion connected by a second connection feature to the second portion, wherein the first portion includes a first distal end of the roof rail, the second portion is a central portion of the roof rail, and the third portion including a second distal end of the roof rail, and wherein the first connection feature and the second connection feature are identical. A cover is connected to the substrate and covers the substrate.

According to several other aspects, a roof rail attachable to a roof of a motor vehicle includes a substrate connected to the roof, the substrate having a first portion connected by a connection feature to a second portion, the first substrate portion and the second substrate portion each include a first wall and a second wall extending generally upward from the roof and a top portion connecting the first wall with the second wall, wherein the first connecting feature includes an alignment feature formed in the first wall of the first portion and a corresponding alignment feature formed in the first wall of the second portion to align the first and second portions together, a first tab extending from the first wall of the first portion or the second portion, the first tab having a first rib configured to melt under sonic welding, a second tab extending from the second wall of the first portion or the second portion, the second tab having a second rib configured to melt under sonic welding, and a flange extending outward from the second wall of the first portion or the second portion and a groove extending outward from the second wall of the other portion, the flange having a third rib on an end thereof configured to melt under sonic welding, the end of the flange disposed within the groove. A cover is connected to the substrate and covers the first walls of the first portion and second portion.

In one aspect, the substrate further includes a third portion connected to the second portion by a second connection feature, the third portion including a second distal end of the roof rail and having a first wall, a second wall, and a top portion connecting the first wall with the second wall, wherein the second connection feature is identical to the first connection feature.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
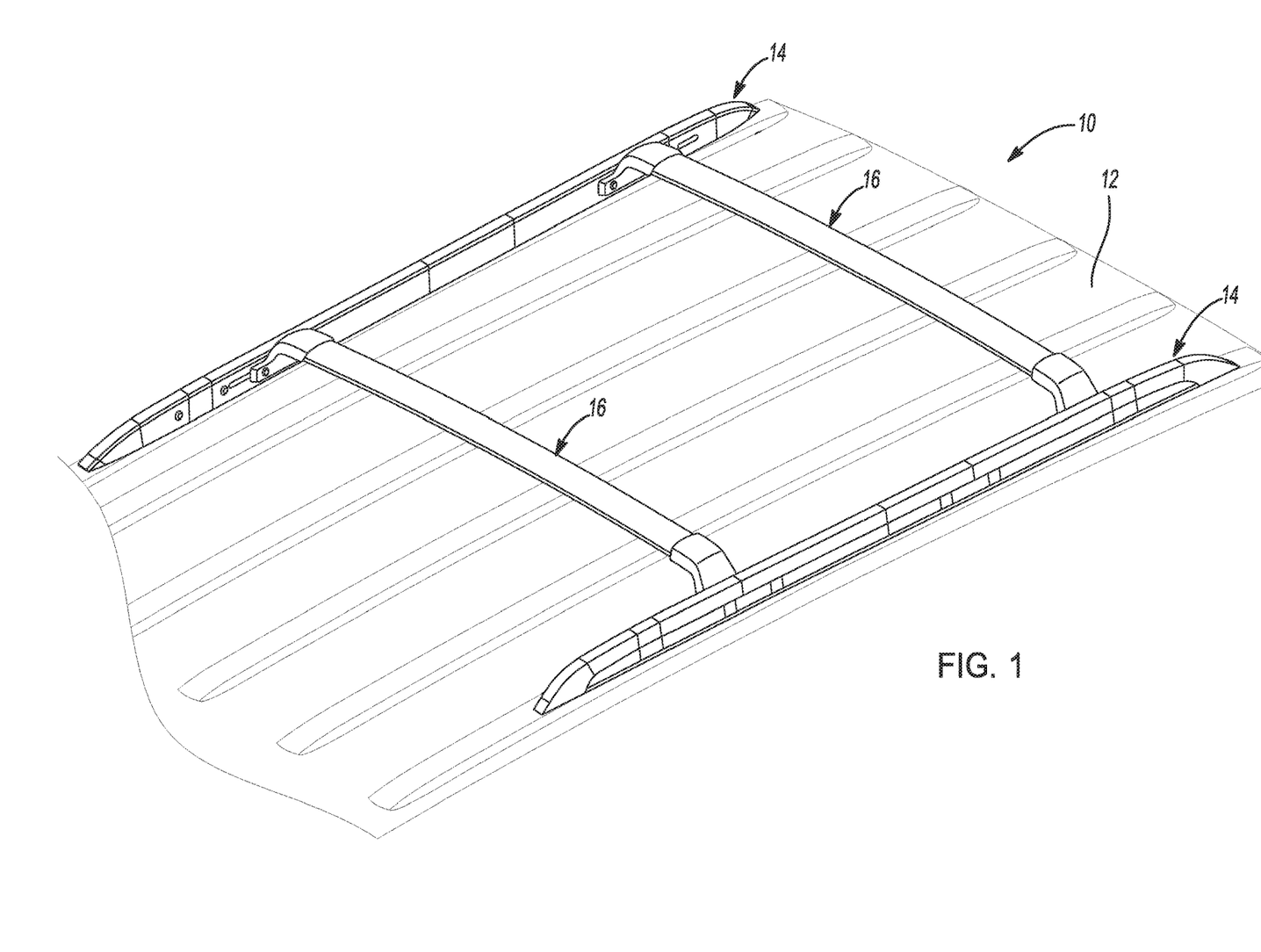
FIG. 1 is a front, perspective view of a roof rail assembly having a modular substrate according to aspects of the present disclosure.

With reference to FIG. 1, a roof rail assembly according to aspects of the present disclosure is generally indicated by reference number 10. The roof rail assembly 10 includes a modular substrate that will be described below. The roof rail assembly 10 is attachable to a roof 12 of a motor vehicle. The roof 12 may have various sizes, shapes, lengths, contours, etc., without departing from the scope of the present disclosure. The roof rail assembly 10 generally includes a pair of roof rails 14 and a pair of crossbars 16. The roof rails 14 are disposed on and connected to the roof 12 and are spaced apart approximately parallel to one another. In this context, the term "approximately" is known to those skilled in the art. Alternatively, the term "approximately" may be read to mean plus or minus 15 degrees from parallel. The crossbars 16 are connected at each end to one of the roof rails 14 to provide a support frame for cargo, bikes, baskets, or any other object to be placed on the roof 12 of the motor vehicle. In the example provided, each of the roof rails 14 are substantially identical, and therefore only one roof rail 14 will be described below.

Figure 2:
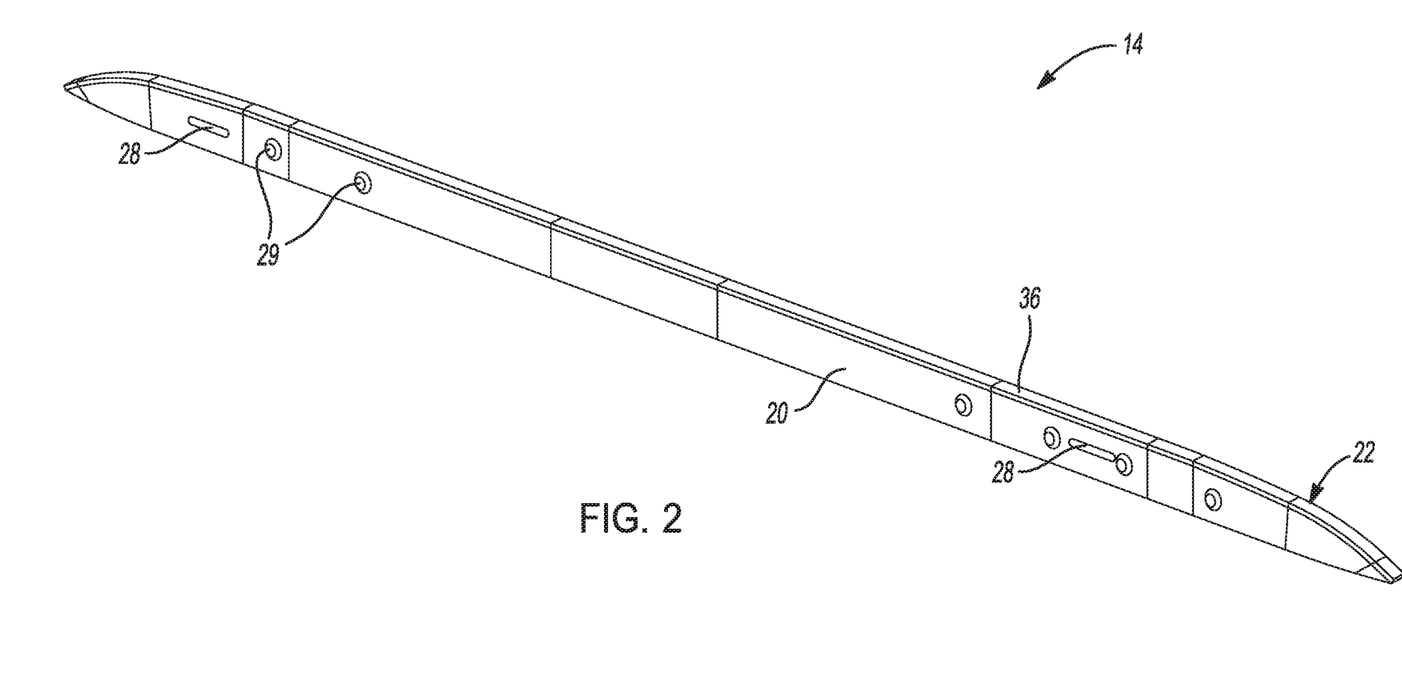
FIG. 2 is an inner, perspective view of a roof rail.
Figures 3, 3A:
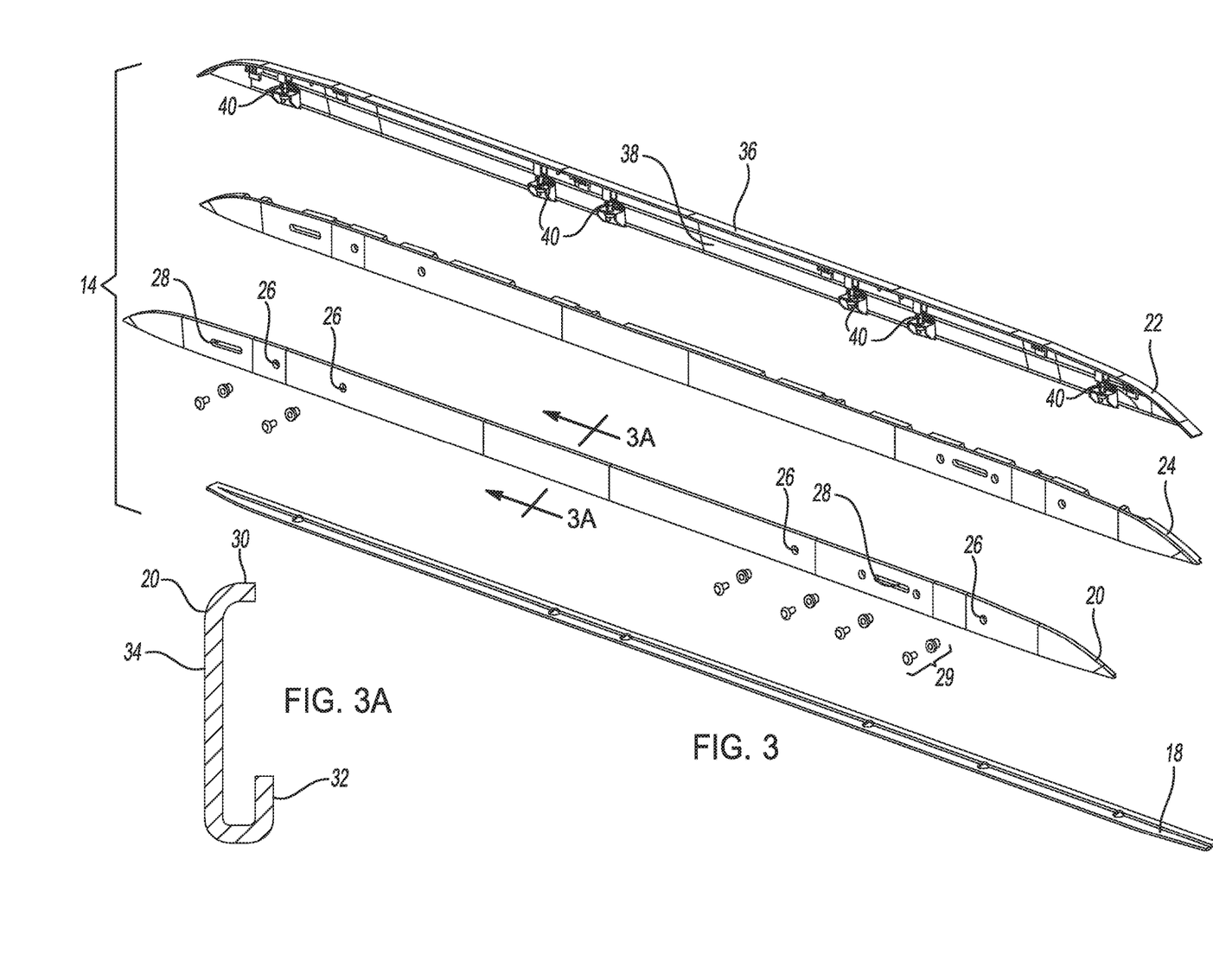
FIG. 3 is an inner, exploded perspective view of the roof rail.
FIG. 3A is a cross-section view of an inner cover viewed in the direction of arrows 3A-3A in FIG. 3.

With reference to FIGS. 2 and 3, the roof rail 14 generally includes a pad seal 18, an inner cover 20, an outer cover assembly 22, and a modular substrate 24 to which the inner cover 20 and outer cover assembly 22 are attached. The modular substrate 24 is connectable to the roof 12. The pad seal 18 is disposed between the modular substrate 24 and the roof 12 of the motor vehicle and provides padding to protect the roof 12 and sealing around the connection points between the modular substrate 24 and the roof 12. The pad seal 18 is preferably made of a thermoplastic elastomer, thought various materials may be employed.

The inner cover 20 is connectable to the modular substrate 24 and is configured to provide a decorative and resilient cover to an inner surface of the modular substrate 24. The inner cover 20 is a roll form or stamped piece made of stainless steel or other decorative but strong material. The inner cover 20 includes rivet holes 26 and guide slots 28 formed therein. A plurality of fasteners, such as rivet-nuts 29, are disposed though the rivet holes 26 to secure the inner cover 20 to the modular substrate 24. With reference to FIG. 3A, the inner cover 20 includes a rolled top 30 and a rolled bottom 32. The rolled top 30 extends substantially perpendicular to a planar portion 34 of the inner cover 20. The rolled bottom 34 extends substantially perpendicular and then substantially parallel to the planar portion 34.

The outer cover assembly 22 is connectable to the modular substrate 24 and is configured to provide a decorative and resilient cover to an outer surface and a top surface of the modular substrate 24. The outer cover assembly 22 generally includes an outer cover 36 and a decorative strip 38. The outer cover assembly 22 is connectable to the modular substrate 24 by connectors 40.

Figures 4, 4A, 5:
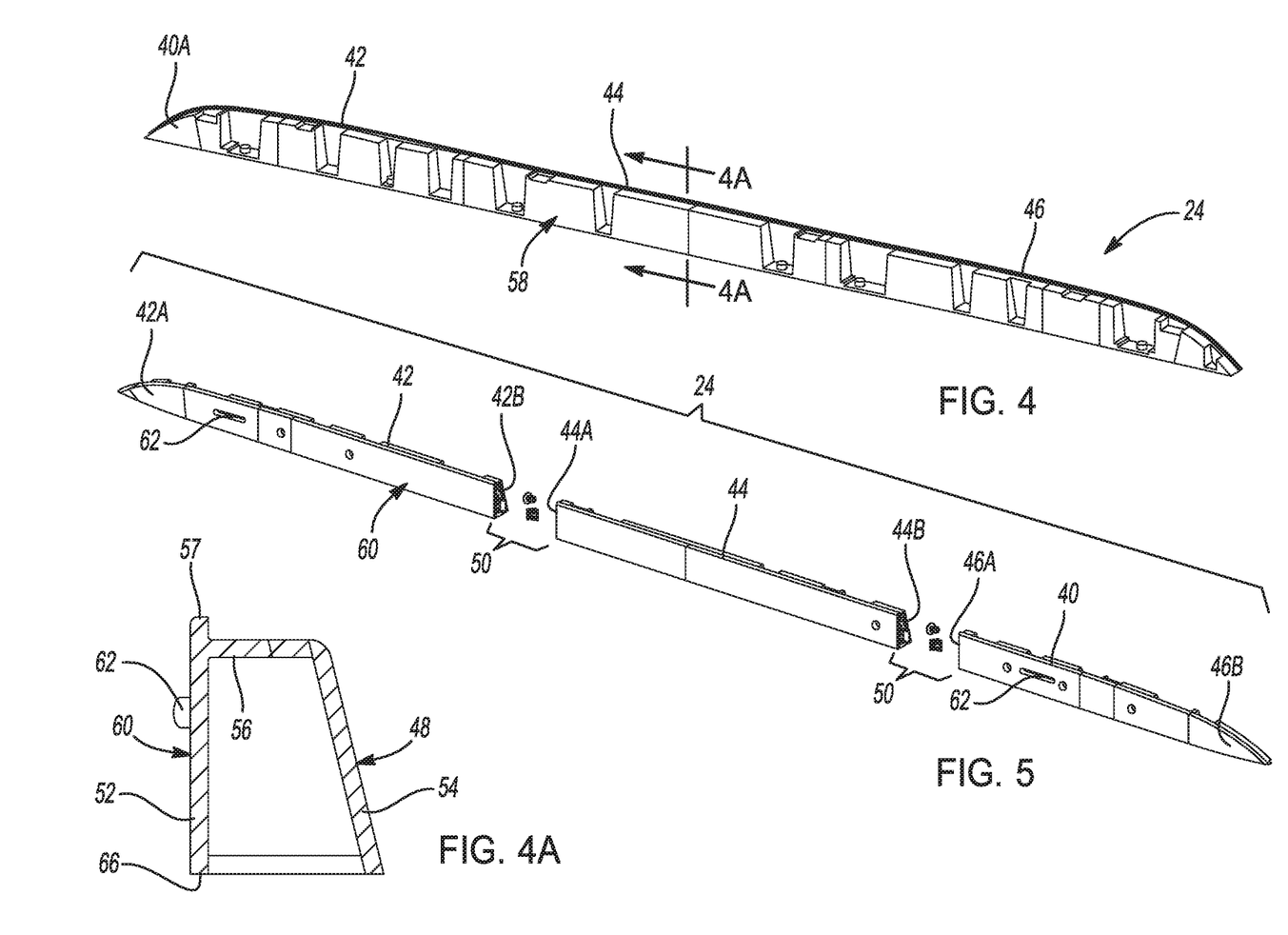
FIG. 4 is an inner perspective view of a modular substrate used with the roof rail.
FIG. 4A is a cross-section view of the modular substrate viewed in the direction of arrows 4A-4A in FIG. 4.
FIG. 5 is an outer perspective, exploded view of the modular substrate.

Turning now to FIGS. 4 and 5, the modular substrate 24 will be described in greater detail. The modular substrate 24 provides the support for the crossbars 16 to the roof 12. The modular substrate 24 generally includes two or more modular portions that, when connected, vary the length of the modular substrate 24. In the example provided, the modular substrate 24 includes a first portion 42 connected to a second portion 44 connected to a third portion 46. However, it should be appreciated that the modular substrate 24 may have various arrangements of the portions 42, 44, 46 without departing from the scope of the present disclosure. For example, the modular substrate 24 may use just the first portion 42 connected the second portion 44, or the first portion 42 connected with the third portion 46, or the first portion 42 connected to a plurality of serially connected second portions 44 which may or may not connect to the third portion 46. Thus, the length of the modular substrate 24 may be tailored to the needs of the roof 12 of the motor vehicle to which it is installed.

The first portion 42 includes a curved, aerodynamic first distal end 42A and an end wall 42B. The first portion 42 thus is configured as a forward section of the roof rail 14. The second portion 44 includes a first end wall 44A and a second end wall 44B. Thus, the second portion 44 is configured as a central portion of the roof rail 14. The third portion 46 includes an end wall 46A and a curved second distal end 46B. Thus, the third portion 46 is configured as a rearward section of the roof rail 14. The portions 42, 44, 46 are connected to one another by connecting features 50, which will be described below.

Turning briefly to FIG. 4A and with continued reference to FIGS. 4 and 5, the modular substrate 24, including each of the portions 42, 44, 46, includes a first wall 52 and a second wall 54 each extending generally upward from the roof 12 and a top portion 56 connecting the first wall 52 and the second wall 54. In this context, the term "generally" is known to those skilled in the art. Alternatively, the term "generally" may be read to mean some portion or part of the walls 52, 54 extend away from the roof 12 even if other parts or portions do not. A lip 57 extends from the first wall 52 above the top portion 56. The first wall 52 defines an inner surface 58 of the modular substrate 24 and the second wall defines an outer surface 60 of the modular substrate 24. The inner surface 58 includes locators 62 sized to fit within the guide slots 28 of the inner cover 20 to locate the inner cover 20 on the modular substrate 24 and holes 64 sized to receive the rivet-nuts 29 to secure the inner cover 20 to the modular substrate 24. When the inner cover 20 is attached to the modular substrate 24, the inner cover 20 is planar with and covers the inner surface 58. In addition, the rolled top 30 (FIG. 3A) is disposed over the lip 57 and the rolled bottom 32 (FIG. 3A) is disposed over a bottom 66 of the first wall 52.

Figure 6:
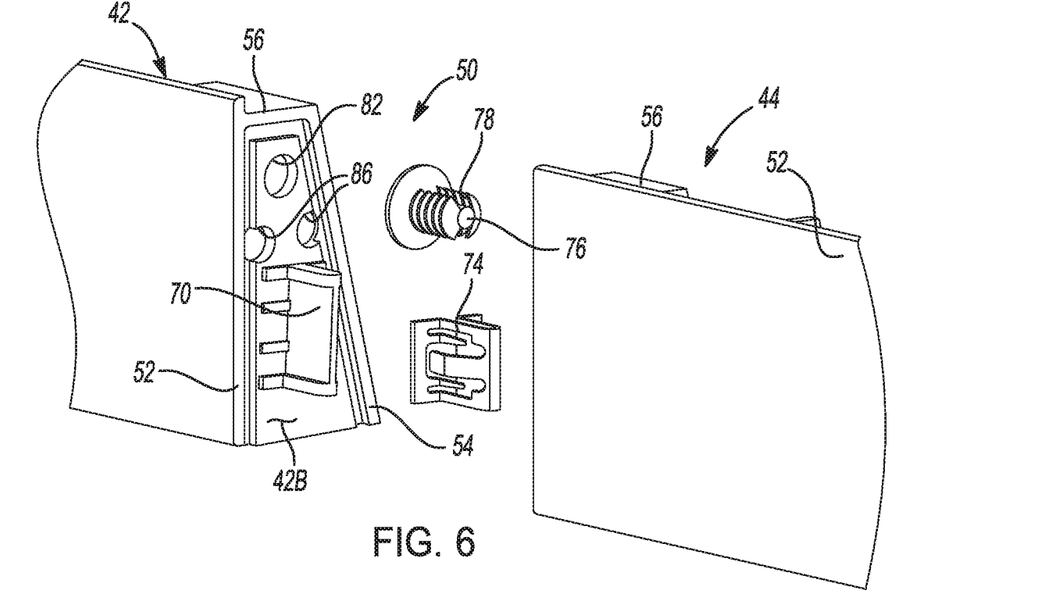
FIG. 6 is an outer, forward facing, exploded perspective view of a first example of a connection portion of the modular substrate.
Figure 7:
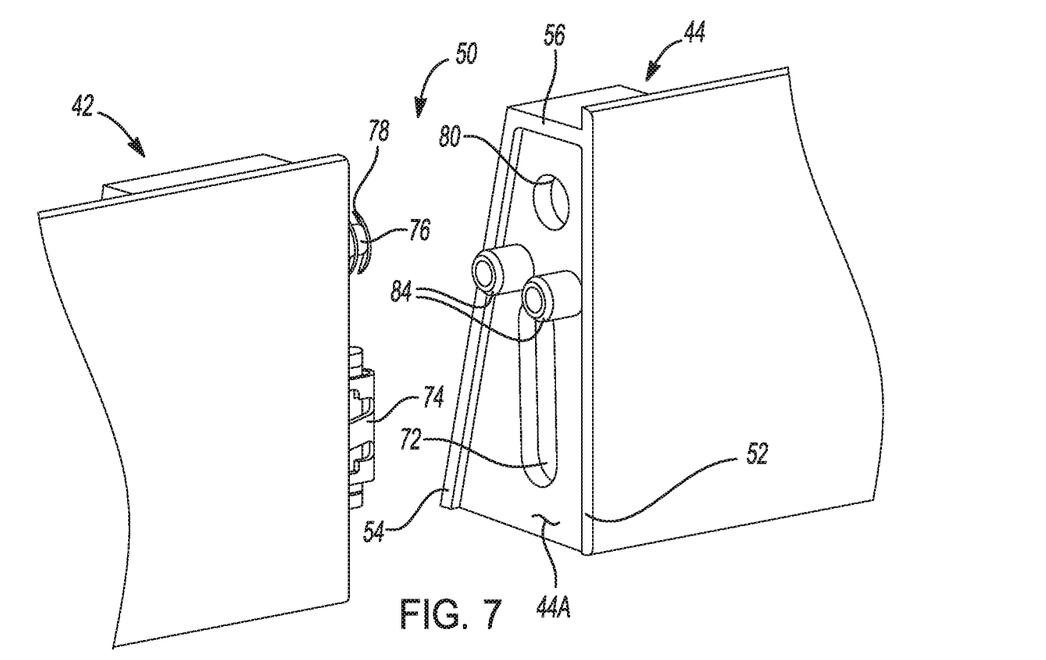
FIG. 7 is an outer, rearward facing, exploded perspective view of the first example of the connection portion of the modular substrate.

With reference to FIGS. 6 and 7, an example of the connection feature 50 will be described between the first portion 42 and the second portion 44, though it should be appreciated that the connection feature 50 may be used between any of the portions 42, 44, 46. As shown, the end walls 42B and 44A each connect with the first wall 52, the second wall 54, and the top portion 56. Likewise, though not shown, end walls 44B, and 46A each connect with the first wall 52, the second wall 54, and the top portion 56. The connection feature 50 includes a rib 70 extending out from the end wall 42B of the first portion 42, a slot 72 formed in the end wall 44A of the second portion 44, and a spring clip 74 disposed on the rib 70. The rib 70 and spring clip 74 are disposed in the slot 72 when the first portion 42 and the second portion 44 are connected. The connection feature 50 further includes a pin 76 having ribs 78 extending out from the end wall 42B of the first portion 42 and a pin aperture 80 formed in the end wall 44A of the second portion 44. The pin 76 is disposed within the pin aperture 80 when the first portion 42 and the second portion 44 are connected. In one embodiment, the pin 76 is a push pin that extends through a push pin hole 82 formed in the end wall 42B of the first portion 42. In another embodiment, the pin may be formed in the end wall 42B. The connecting feature 50 also includes one or more studs 84 extending out from the end wall 44A of the second portion 44 and one or more stud apertures 86 formed in the end wall 42B of the first portion 42. The studs 84 are disposed within the stud apertures 86 when the first portion 42 and the second portion 44 are connected. In addition, an adhesive may be disposed on disposed on the end walls 42B or 44A to secure the portions 42, 44 together. It should be appreciated that the connection feature 50 may be reversed such that the rib 70, spring clip 74, pin 76, stud apertures 82, 86 are located on the end wall 44A of the second portion 44 while the slot 72, studs 84, and pin aperture 80 may be located on the end wall 42B of the first portion 42.

In yet another example, a U-clip (not shown) may also be used to secure the end walls 42B and 44A together. The U-clip would be inserted from the bottom of the portions 42, 44 and hold the end walls 42B and 44A in contact with each other. The U-clip may be used to replace the rib 70 and spring clip 74.

Figure 8:
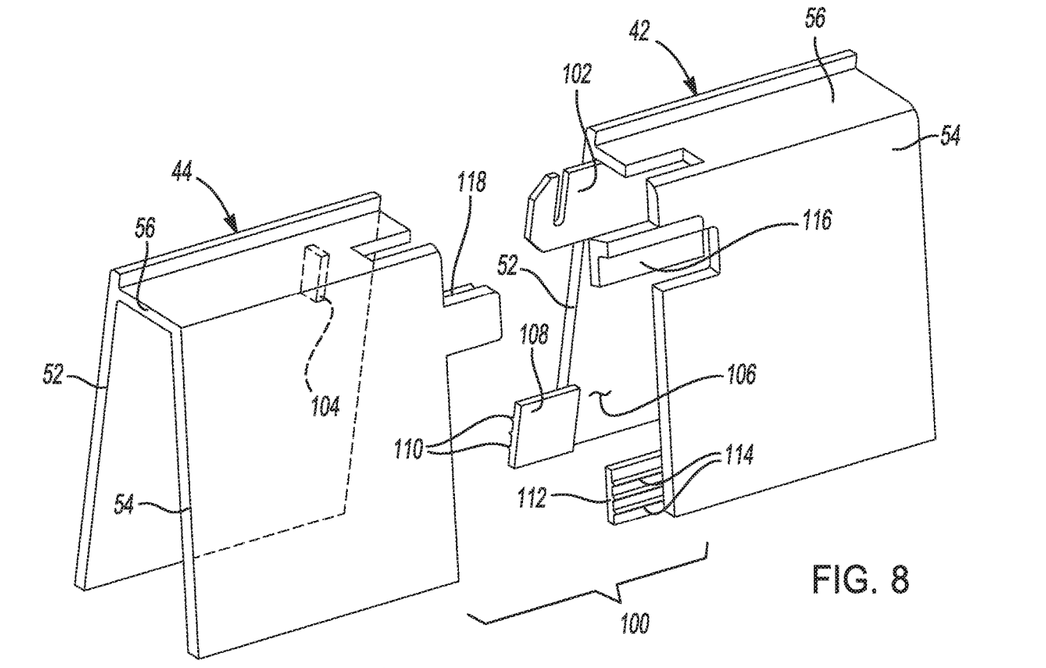
FIG. 8 is an inner, exploded perspective view of a second example of the connection portion of the modular substrate.
Figure 9:
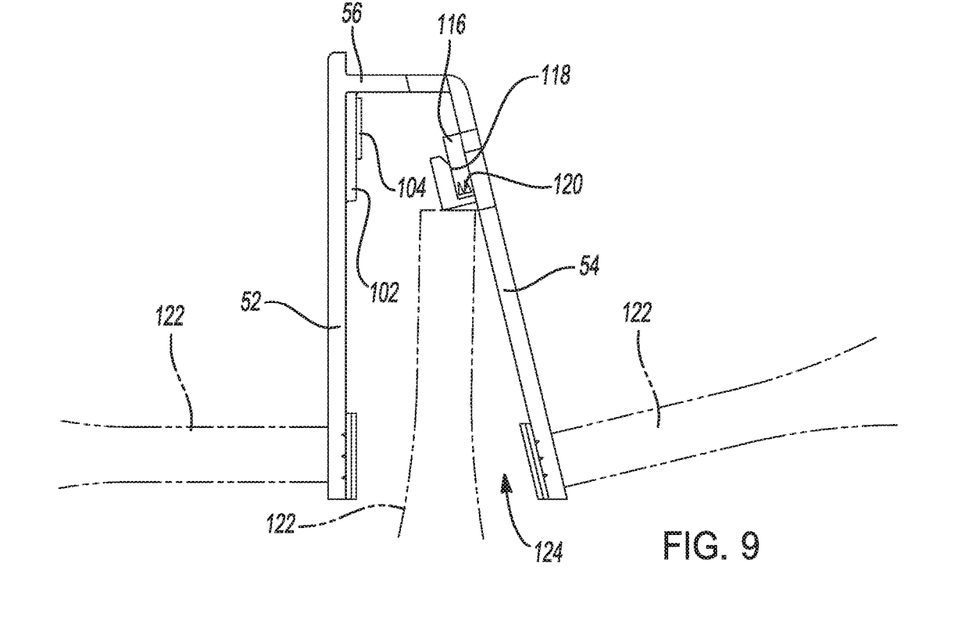
FIG. 9 is a cross-section view of the second example of the connection portion of the modular substrate.

With reference to FIGS. 8 and 9, an alternate example of a connection feature is generally indicated by reference number 100. In this example, the portions 42, 44, 46 do not include end walls. The connection feature 100 includes a hook 102 formed in the first wall 52 of the first portion 42 and a tab 104 formed in the first wall 52 of the second portion 44. The hook 102 extends out from an end of the first portion 42. The tab 104 is sized to fit within the hook 102 to align the first portion 42 and the second portion 44 together. In one example, the tab 104 and the hook 102 are formed on an inner side 106 in the first wall 52.

The connection feature 100 also includes a first tab 108 extending from the first wall 52 of the first portion 44. The first tab 108 extends out from an end of the first portion 42. The first tab 108 includes one or more first ribs 110 that run along a length of the first tab 108. The first ribs 110 are configured to melt under sonic welding. A second tab 112 extends from the second wall 54 of the first portion 44. The second tab 112 extends out from an end of the first portion 42. The second tab 112 includes one or more second ribs 114 that run along a length of the second tab 112. The second ribs 114 are configured to melt under sonic welding.

The connection feature 100 further includes a flange 116 extending outward from the second wall 54 of the first portion 44 and a groove 118 extending outward from the second wall 54 of the second portion 44. The flange 116 extends out from an end of the first portion 42 while the groove extends out from an end of the second portion 44. The flange 116 is size to fit within the groove 118. The groove 118 includes one or more third ribs 120 configured to melt under sonic welding.

To connect the first portion 42 to the second portion 44 using the connection features 100, the tab 104 is placed within the hook 102 to align the first portion 42 and the second portion 44. Then, a sonic welder, indicated by dashed lines and reference number 122, is inserted through an opening 124 at the bottom of the first portion 42 and second portion 44 and the flange 116 is sonically welded to the groove 118. The third ribs 120 melt to improve the strength of the weld. Likewise, the first and second tabs 108, 112 are sonically welded to the insides of the first wall 52 and second wall 54 of the second portion 44. It should be appreciated that the components of the connection feature 100 may be reversed with those disposed on the first portion 42 now disposed on the second portion 44, and vice versa, without departing from the scope of the present disclosure.

The modular substrate 24 offers several advantages. The modular substrate 24 allows the reuse of parts across multiple vehicle types since the modular substrate 24 can be shortened or extended by adding or removing portions 42, 44, 46. This in turn reduces tooling and press costs for producing the roof rail 14. The connection features 50, 100 are simple and resilient allowing for easy assembly despite having multiple portions 42, 44, 46 for any given roof rail 14.

The terms "forward", "rear", "inner", "inwardly", "outer", "outwardly", "above", and "below" are terms used relative to the orientation of the motor vehicle as shown in the drawings of the present application. Thus, "forward" refers to a direction toward a front of a motor vehicle, "rearward" refers to a direction toward a rear of a motor vehicle, "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle.

Additionally, in the claims and specification, certain elements are designated as "first", "second", "third", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The description of the invention is merely exemplary in nature and variations that do not depart from the gist of the invention are intended to be within the scope of the invention. Such variations are not to be regarded as a departure from the spirit and scope of the invention.

The following is claimed:

1. A roof rail attachable to a roof of a motor vehicle, the roof rail comprising:
   a substrate connected to the roof, the substrate having a first portion connected by a first connection feature to a second portion; and
   a cover connected to the substrate and covering the substrate;
   wherein the first substrate portion and the second substrate portion each include a first wall and a second wall extending generally upward from the roof and a top portion connecting the first wall with the second wall, and
   wherein the first connecting feature includes a hook formed in the first wall or the second wall of the first portion and a tab formed in the first wall or the second wall of the second portion, wherein the tab is sized to fit within the hook to align the first and second portions together.

2. The roof rail of claim 1 wherein the first portion includes a first distal end of the roof rail and the second portion is a central portion of the roof rail.

3. The roof rail of claim 2 wherein the substrate further includes a third portion connected to the second portion by a second connection feature, the third portion including a second distal end of the roof rail.

4. The roof rail of claim 1 wherein the tab and the hook are formed in the first wall.

5. The roof rail of claim 4 wherein the first connecting feature further comprises a first tab extending from the first wall of the first portion or the second portion, the first tab having a first rib configured to melt under sonic welding.

6. The roof rail of claim 5 wherein the first connecting feature further comprises a second tab extending from the second wall of the first portion or the second portion, the second tab having a second rib configured to melt under sonic welding.

7. The roof rail of claim 4 wherein the first connecting feature further comprises a flange extending outward from the second wall of the first portion or the second portion and a groove extending outward from the second wall of the other portion, the flange fits within the groove.

8. The roof rail of claim 7 wherein the groove includes a third rib configured to melt under sonic welding.

9. The roof rail of claim 1 wherein the cover includes a rolled top that is disposed over a lip that extends out from the top portion and is planar with the first wall and a rolled bottom that is disposed over a bottom of the first wall.

10. A roof rail attachable to a roof of a motor vehicle, the roof rail comprising:
    a substrate connected to the roof, the substrate having a first portion connected by a first connection feature to a second portion; and
    a cover connected to the substrate and covering the substrate, wherein the cover forms an inner decorative surface of the roof rail.

11. A roof rail attachable to a roof of a motor vehicle, the roof rail comprising:
    a substrate connected to the roof, the substrate having a first portion connected by a connection feature to a second portion, the first substrate portion and the second substrate portion each include a first wall and a second wall extending generally upward from the roof and a top portion connecting the first wall with the second wall, wherein the first connecting feature includes an alignment feature formed in the first wall of the first portion and a corresponding alignment feature formed in the first wall of the second portion to align the first and second portions together, a first tab extending from the first wall of the first portion or the second portion, the first tab having a first rib configured to melt under sonic welding, a second tab extending from the second wall of the first portion or the second portion, the second tab having a second rib configured to melt under sonic welding, and a flange extending outward from the second wall of the first portion or the second portion and a groove extending outward from the second wall of the other portion, the flange having a third rib on an end thereof configured to melt under sonic welding, the end of the flange disposed within the groove; and
    a cover connected to the substrate and covering the first walls of the first portion and second portion.

12. The roof rail of claim 11 wherein the substrate further includes a third portion connected to the second portion by a second connection feature, the third portion including a second distal end of the roof rail and having a first wall, a second wall, and a top portion connecting the first wall with the second wall, wherein the second connection feature is identical to the first connection feature.

* * * * *